C. J. Dumery,
Tanning Apparatus.

Nº 63,869.  Patented Apr. 16, 1867.

Witnesses;

Inventor;
C. J. Dumery

United States Patent Office.

CONSTANT J. DUMERY, OF PARIS, FRANCE, ASSIGNOR TO FRANCIS C. CORMIER, OF NEW YORK, N. Y.

Letters Patent No. 63,869, dated April 16, 1867; antedated April 10, 1867.

IMPROVED APPARATUS FOR TANNING.

*The Schedule referred to in these Letters Patent and making part of the same.*

TO ALL WHOM IT MAY CONCERN:

Be it known that I, CONSTANT JOUFFROY DUMÉRY, of Paris, France, civil engineer, have invented a new or improved Apparatus for Extracting from Water or other Liquid the Bodies held in Solution or Suspension therein; and I do hereby declare that the following is a full, clear, and exact description of the same, reference being had to the accompanying drawings, making a part of this specification, in which—

Similar letters of reference indicate corresponding parts in all the figures.

This invention has for its object the separation from water or other liquids of foreign matters dissolved or held in suspension therein, either for the purpose of purifying the liquid or for the utilization of such foreign matters; and it consists in a novel construction of an apparatus, whereby the liquid is heated to a temperature sufficient to solidify the foreign substances suspended or held in solution therein, and then conducted to a cooling chamber or receptacle in which the said foreign substances are precipitated, the liquid flowing back into the heating-vessel or boiler, so that a continued circulation of the said liquid is maintained, whereby the complete separation of all the foreign matters contained therein is effectually insured.

To enable others to understand the construction and operation of my invention, I will proceed to describe it with reference to the drawings.

Figure 4:
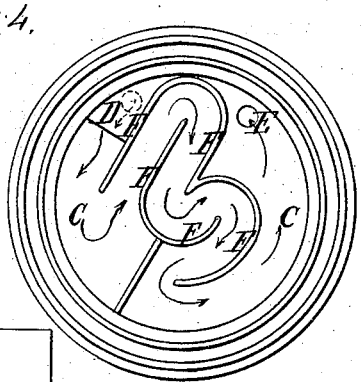
Figure 4 is an inverted plan view of the top or upper portion of the said receptacle.
Figure 1:
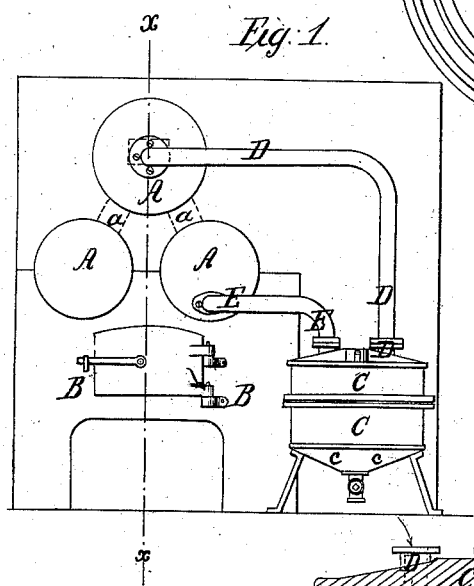
Figure 1 is a front elevation.
Figure 2:
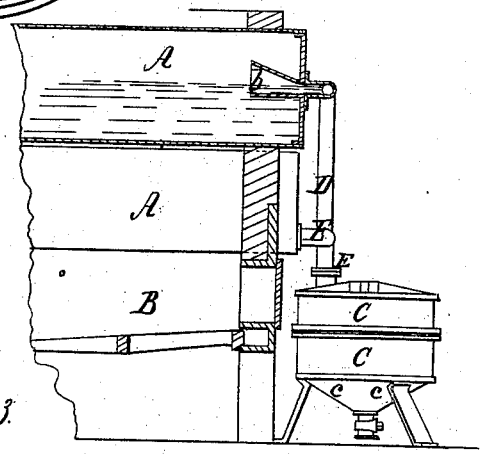
Figure 2 is a vertical transverse section, taken in the line $x\ x$ of fig. 1.
Figure 3:
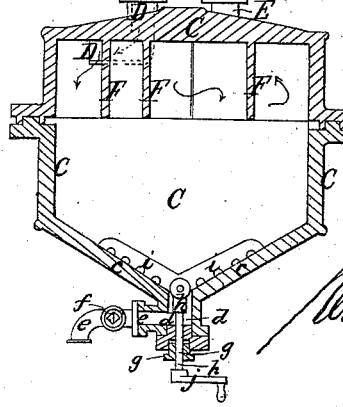
Figure 3 is a vertical transverse section of the receptacle, in which the foreign matters are precipitated from the liquid.

The invention is represented in the drawings as applied to the purification of water for steam boilers, to prevent the formation of scale or incrustations therein. A indicates three horizontal boilers, which are connected by suitable tubes $a$, and constitute, in fact, but a single boiler. Underneath this boiler is a suitable furnace, B. C represents a separate chamber or receptacle, which is placed outside of the boiler A, and which may be divided horizontally into two parts so that it may be opened when desired, the said parts being tightly joined together when the apparatus is in use, as represented in the drawing. D is a bent pipe or tube, the lower end of which passes through the top of the receptacle C, and communicates with the interior thereof, while the opposite or upper end of the said tube passes through the end of the uppermost portion of the boiler, and has a funnel, $b$, formed upon it, the said funnel $b$ projecting into the boiler, as shown in fig. 2. E is another curved pipe or tube, the outer or lower end of which passes through the top of the receptacle C, in the same manner as the lower end of the tube D, while the upper end thereof communicates with the lower part of the boiler A. Projecting downward, and in a vertical position from the inner or under side of the top of the receptacle C, are two or more curved or serpentine plates or short partitions, E, while the bottom of the said receptacle is shaped like an inverted cone, as shown at $c$, and has formed in it a central opening, $d$, the lower end of which communicates with a suitable tube, $e$, which is furnished with a cock or valve, $f$. Passing up through the opening $d$, and with its lower end surrounded by a suitable stuffing-box, $g$, is a vertical stem, $h$, to the upper end of which is fixed any desired number of radial agitating arms or blades, $i$, the lower edges of which are in contact with the inner surface of the bottom $c$, as represented in fig. 3. Secured upon the lower end of the stem $h$ is a crank, $j$, by means of which the said stem is rotated to operate the agitating arms $i$, in order to facilitate the removal from the receptacle C of the substances precipitated therein, as will be presently further set forth. The boiler A is filled with water to a height above the upper end of the tube D, and is heated by the fire in the furnace B to a temperature sufficient to solidify the foreign matters contained in the water into solid particles, the heated water in the upper part of the boiler passing through the pipe D into the receptacle C. The water in the lower portion of this receptacle is comparatively quiet or still, while the heated water from the boiler passes between the curved or serpentine portions F, as shown by the red lines in fig. 3, toward the opening formed by the lower end of the pipe E, as shown by the arrows in red lines in figs. 3 and 4; and inasmuch as the motion of the water in passing between the said partitions is very slow, and as it is cooled or has its temperature reduced during such passage, the particles of foreign matter contained therein are precipitated or allowed to descend by their own weight to the bottom $c$ of the said receptacle. The water, after passing between the partitions F, as just set forth, passes into and through the pipe E, and re-enters the boiler at the lower part thereof, and is again heated, the water thus circulating continually through the boiler A, the pipes D E, and the receptacle C, and depositing the solid particles of foreign matter suspended therein in the said receptacle, as just herein explained, so that the water is rendered pure and thus prevented from depositing "scale" or "incrustation" within the boiler. The size of the pipes D and E should be proportioned to the rapidity with which it is desired to have the water pass through the receptacle C, or an additional number of such pipes may be employed. When it is desired to remove the deposit of foreign matter from the receptacle C the cock or valve $f$ is opened and the stem $h$ is turned by means of the crank $j$, thus revolving the agitating arms or blades $i$, which causes the sediment or foreign matter aforesaid mingled with the water to flow freely through the opening $d$ and tube $e$. The apparatus may not only be employed for purifying water for boilers or similar purposes, as just set forth, but may also be used in the same manner for separating useful or desirable substances from their solutions in water or other liquids, such substances being precipitated in the receptacle C, and removed therefrom in the same manner as when the apparatus is employed in the purification of liquids, as hereinbefore fully set forth.

What I claim as new, and desire to secure by Letters Patent, is—

1. The receptacle C, applied outside of the boiler or heating-vessel A, and communicating therewith by means of the pipes D E, substantially as herein set forth for the purpose specified.

2. The agitating blades or arms $i$, arranged within the receptacle C, and in relation with the opening $d$ and tube $e$, substantially as herein set forth for the purpose specified.

3. The serpentine partitions F, arranged in the upper part of the receptacle C, substantially as herein set forth for the purpose specified.

C. J. DUMERY.

Witnesses:
   EDWARD TUCK,
   D. EMOS.